United States Patent
Kakinami et al.

(10) Patent No.: US 6,205,234 B1
(45) Date of Patent: *Mar. 20, 2001

(54) IMAGE PROCESSING SYSTEM

(75) Inventors: Toshiaki Kakinami, Nagoya; Yoshikatsu Kimura, Anjo; Ryo Inoue, Nagoya, all of (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,726

(22) Filed: Jul. 21, 1997

(30) Foreign Application Priority Data

Jul. 31, 1996  (JP) ................................ 8-219345

(51) Int. Cl.⁷ ................................ G06K 9/46
(52) U.S. Cl. ................ 382/104; 382/199; 382/283
(58) Field of Search ................ 358/453, 450, 358/448, 451, 445; 382/160, 104, 205, 195, 199, 209, 216, 217, 218, 154, 286, 291, 283

(56) References Cited

FOREIGN PATENT DOCUMENTS

| 6-215106 | 8/1994 | (JP) . | |
| 6-215137 | 8/1994 | (JP) . | |
| 6215106 | * 8/1994 | (JP) | ........ 358/453 |
| 6215137 | * 8/1994 | (JP) | ........ 358/453 |

* cited by examiner

Primary Examiner—Scott Rogers
(74) Attorney, Agent, or Firm—Sughrue, Mion, Zinn, Macpeak & Seas, PLLC

(57) ABSTRACT

The invention is directed to an image processing system, which includes an image sensor (DD) for introducing image information of an object to detect image data for indicating at least a density of the object. A scanning table memory (TM) is adapted to provide addresses in accordance with horizontal or vertical scanning lines, and provide a horizontal or vertical location information for each address. Also, the memory (TM) is adapted to provide a window on the basis of the location information and in accordance with the object, and store the window in a table memory. And, an image processor (DP) is adapted to provide a desired image on the basis of a logical product of the image data and the window. The memory (TM) is adapted to provide the window for the image which will be used at the next iteration step on the basis of the desired image formed by the image processor (DP). The memory (TM) may include a window setting unit (WM) which is adapted to set a x-coordinate and a y-coordinate to at least a reference point for each address on the basis of the image data provided for forming the desired image, and set a predetermined width to each reference point to provide the window and store the window in the table memory.

10 Claims, 9 Drawing Sheets

IMAGE PROCESSING SYSTEM

BACKGROUND OF THE INVENTION

1. Field of the Invention

The present invention relates to an image processing system, more particularly to the image processing system for providing a desired image display for an object to be detected, on the basis of image information in a visible region corresponding to a field of view of a vehicle driver.

2. Description of the Related Arts

Recently, an image processing system is proposed for processing image information in a visible region in front of an automotive vehicle to form an image for various uses. According to Japanese Patent Laid-open Publication No. 6-215137, for example, it is proposed to provide an image processing system for detecting edge points in an image rapidly. This system is adapted to determine a scanning region by combining scanning line information such as a coordinate for beginning the scanning process and a coordinate for ending the scanning process, which are stored in a scanning table memory device.

In order to detect borders of a white line for defining the vehicle's path and extending ahead of the vehicle, theoretically it is sufficient to scan image data in a relatively narrow region to obtain edge points of the white line, because a region of a road wherein the white line is disposed is generally limited to a certain narrow region. However, a region for detecting an object is complex in shape, that scanning process could not be practiced in the system prior to the system proposed in the publication. According to the proposed system in the publication, therefore, the scanning region which is called as a "window" is determined in accordance with the combination of the scanning line information such as the coordinate for beginning the scanning process and the coordinate for ending the scanning process, which are stored in a scanning table memory device. According to the system, therefore, the scanning region, i.e., window, is not limited in shape, so that the detection of the white line can be made in a relatively short period by scanning only the minimum region.

The image processing system disclosed in the above publication is installed on the automotive vehicle, for example, and used to distinguish a boundary of a road in the driver's field of view when the vehicle travels on the road, i.e., along the white line of a lane. In this respect, by means of the window for encircling the white line, it is possible to increase a speed for detecting edges through a density in the image information, and prevent noise edges from being caused by foul or material on the road other than the white line to be detected, and improve the detection accuracy. The word of "edge" means a step-like variation in a density of an image, i.e., a place where brightness of the image varies to a great extent, so that the edge generally resides on an outline of an object.

In order to increase the speed for detecting the edges, it is preferable to form the window in a pattern corresponding to the shape of the object. In the above-described system, for example, it is preferable to form the window as narrow as possible to encircle only the white line of the lane. However, the lanes appeared on the image are of so many kinds that a large number of window patterns are to be provided in advance, and a window having an appropriate pattern is to be selected from the window patterns. Therefore, a large capacity of memory is necessitated, and it takes much time to select the appropriate pattern, so that the processing time might be extended.

Furthermore, if the object is varied in shape, for example the object is a curved lane which resides in a visible region in front of the vehicle, it is necessary to provide a plurality of windows for various patterns in advance in order to trace the curve of the lane properly and perform a necessary process immediately, so that a large capacity of memory is required.

SUMMARY OF THE INVENTION

Accordingly, it is an object of the present invention to provide an image processing system, which is capable of setting appropriate windows for various objects with a relatively small capacity of memory.

It is another object of the present invention to provide an image processing system for use in an automotive vehicle.

In accomplishing these and other objects, an image processing system includes an image detection device for introducing image information of an object to detect image data for indicating at least a density of the object. A scanning table memory is adapted to provide addresses in accordance with horizontal or vertical scanning lines, and provide a horizontal or vertical location information for each address. The scanning table memory is also adapted to provide a window on the basis of the location information and in accordance with the object, and store the window in a table memory. And, an image processing device is provided for forming a desired image on the basis of a logical product of the image data and the window. The scanning table memory is adapted to provide the window for the image formed at a next iteration step on the basis of the desired image formed by the image processing device.

Preferably, the scanning table memory includes a window setting device for setting a x-coordinate and a y-coordinate to at least a reference point for each address on the basis of the image data provided for forming the desired image, and setting a predetermined width to each reference point to provide the window and store the window in the table memory. The scanning table memory may include a window setting device for setting a x-coordinate and a y-coordinate to each of a beginning point and an end point for each address on the basis of said image data provided for forming the desired image to provide the window and store the window in the table memory.

It is preferable that the image detection device includes an edge detection device for detecting edges of the object on the basis of the density of the image information.

The image processing system may further include a camera for picking up image information in a visible region including the image information of the object, and the edge detection device may be adapted to introduce the image information picked up by the camera to detect the edges.

Preferably, the image processing system further includes an image memory for storing the image data detected by the image detection device, and the image processing device is adapted to form the desired image on the basis of the logical product of the image data stored in the image memory and the window provided by the scanning table memory. The image memory may include an edge memory for storing the edges detected by the edge detection device. The image processing system may be installed on an automotive vehicle to be used for a front view monitoring system.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
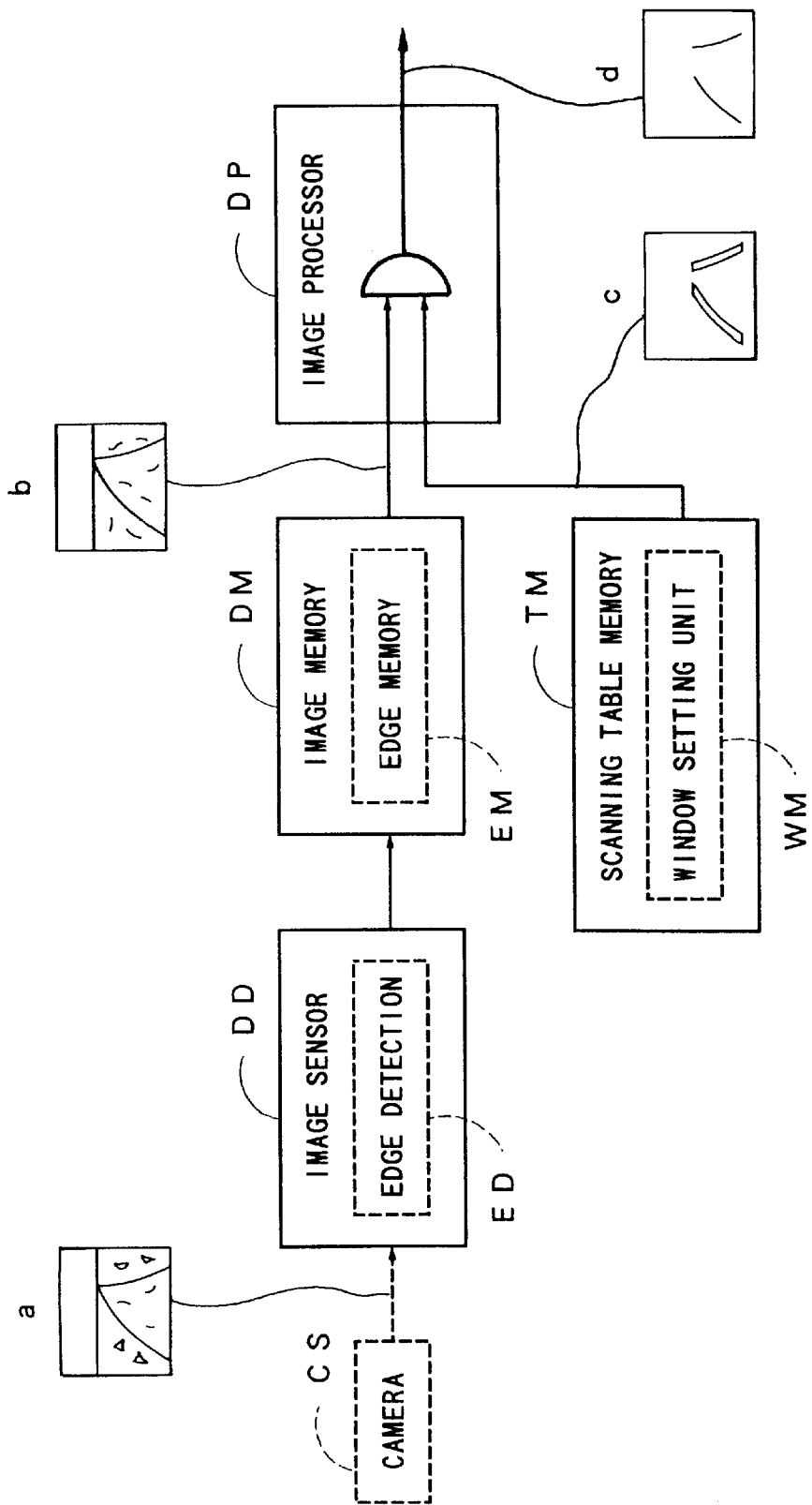
FIG.1 is a block diagram of an image processing system according to an embodiment of the present invention.

Referring to FIG.1, there is disclosed an image processing system according to an embodiment of the present invention. The image processing system includes an image sensor (DD) which introduces image information of an object to detect image data for indicating at least a density of the object. A scanning table memory (TM) is adapted to provide addresses in accordance with horizontal or vertical scanning lines, and provide a horizontal or vertical location information for each address. Also, the scanning table memory (TM) is adapted to provide a window on the basis of the location information and in accordance with the object, and store the window in a table memory. And, an image processor (DP) is adapted to provide a desired image on the basis of a logical product of the image data and the window. The scanning table memory (TM) is adapted to provide the window for the image which will be used at the next iteration step on the basis of the desired image formed by the image processor (DP). In FIG.1, references "a" to "d" indicate examples of the images obtained by each output as indicated in FIG.1.

In the image processing system as illustrated in FIG. 1, the scanning table memory may include a window setting unit (WM) which is adapted to set a x-coordinate and a y-coordinate to at least a reference point for each address on the basis of the image data provided for forming the desired image, and set a predetermined width to each reference point to provide the window and store the window in the table memory.

Figure 2:
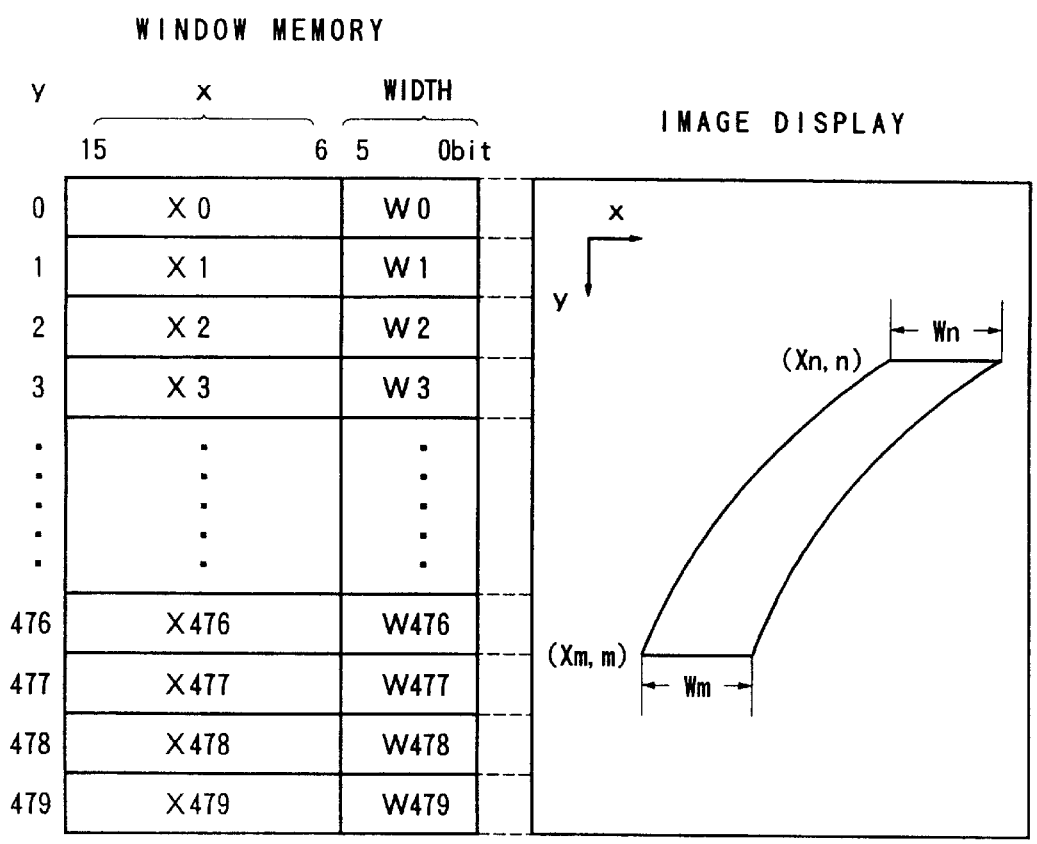
FIG.2 is a diagram of a table memory for setting a window according to an embodiment of the present invention.

Referring to FIG.2, an example of the table memory for setting a window used in the window setting unit (WM) will be explained hereinafter. Addresses of 0 to 479 are given to 480 scanning lines extending horizontally or vertically, in parallel with the x-coordinate according to the example as shown in FIG.2, respectively. Every address is given the z-coordinate or y-coordinate of at least a reference point, one of X0 to X479 on the x-coordinate according to the example in FIG.2, and a predetermined width for each reference point, one of W0 to W479 according to the example in FIG.2, which are stored in the memory. In FIG.2, the left upper corner on a rectangular display is given the x-y coordinate of (0,0), and the right lower corner on the display is given the x-y coordinate of (639, 479). If 16 bits are employed in the table memory, 10 bits are used for setting the x-coordinate of the window, and 6 bits are used for setting the width of the window as shown in FIG.2. If 32 bits are employed in the table memory, however, the width of the window may be set as broad as the full width of the display.

The image sensor (DD) may include an edge detection unit (ED) which detects edges of the object on the basis of the density of the image information. Furthermore, a camera (CS) may be provided for picking up the image information in a visible region including the image information of the object, and the edge detection unit (ED) may be adapted to introduce the image information picked up by the camera (CS) to detect the edges.

Furthermore, an image memory (DM) may be disposed between the image sensor (DD) and the image processor (DP), so that the image memory (DM) stores the image data detected by the image sensor (DD), and that the image processor (DP) provides the desired image on the basis of the logical product of the image data stored in the image memory (DM) and the window provided by the scanning table memory (TM). The image memory (DM) may include an edge memory (EN) which stores the edges detected by the edge detection unit (ED) in the image sensor (DD).

The scanning table memory (TM) may be adapted to provide the window for detecting a single object in a single table memory. The image processor (DP) may be adapted to convert a logical product of the window and the image data into an image on a plane in a three-dimensional geometry to form the desired image including the object, and further convert the image on the plane in the three-dimensional geometry into an image on a plane in a two-dimensional geometry. And, the scanning table memory (TM) may be adapted to provide the window for the image which will be formed at the next iteration step on the basis of the converted result by the image processor (DP). Accordingly, the image processing system can be properly applied to a system for monitoring the front view of the vehicle driver, as will be described hereinafter.

Figure 3:
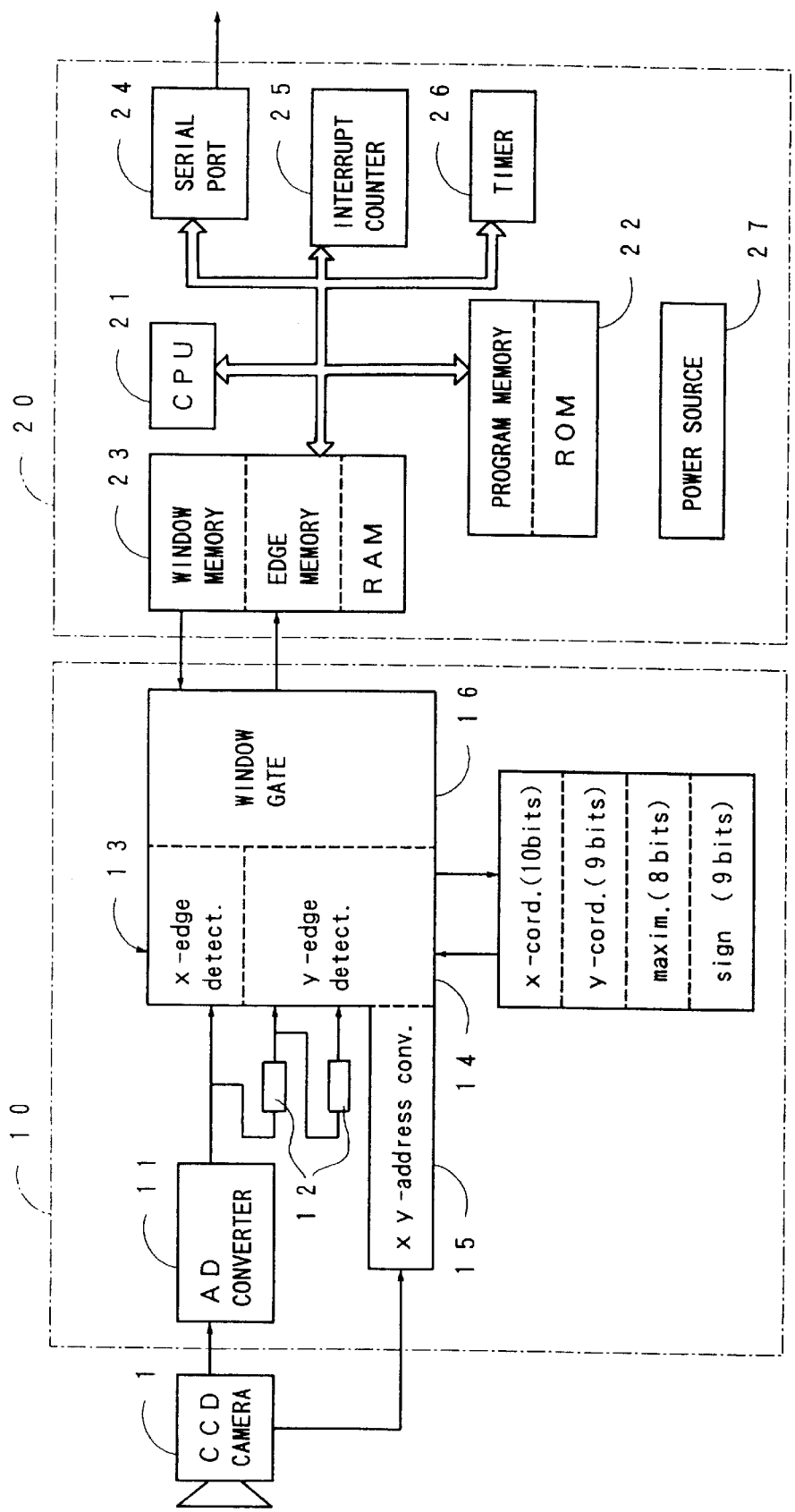
FIG.3 is an overall block diagram of an image processing system according to an embodiment of the present invention.

More specifically, the details of the embodiment disclosed in FIG.1 are illustrated in FIG.3, wherein the image processing system is adapted to provide a desired image with respect to an object which resides in a visible region which corresponds to the front view of the vehicle driver, so as to detect the object and indicate it on an display. Referring to FIG.3, the image processing system includes a CCD camera 1 having a CCD of a solid state image pick up device which is disposed in the vicinity of a view point of the driver in a compartment of the vehicle (not shown), to pick up the images in the front visible region. The image signals detected by the CCD camera 1 are analogue signals which are fed into an AD converter 11 in an edge detection section 10 to be converted into digital signals corresponding to a density of the image.

In the edge detection section 10, output signals from the AD converter 11 are fed through two line buffers 12 into a Sobel edge extracting operator 14 in a detection circuit 13 to detect an edge on the x-coordinate and an edge on the y-coordinate, respectively. Furthermore, an output signal from the CCD camera 1 is fed into a x-y address conversion section 15 as a synchronous signal. In this respect, ten bits are provided for defining the edge on the x-coordinate, while nine bits are provided for defining the edge on the y-coordinate. Eight bits are provided for defining the maximum value, and one bit is provided for defining a sign, i.e., positive or negative. The detection circuit 13 is provided with a window gate 16 which will be described later, and connected to an object determination unit 20. The edge detection section 10 may be formed by a gate array.

The object determination unit 20 is formed by a microcomputer which includes a CPU 21, RON 22, RAM 23, serial port 24 for output, interruption counter 25, timer 26 and so on, which are connected with each other through an address bus and a data/control bus. A power source 27 is disposed in the object determination unit 20. The RAN 23 includes a window memory 23w and an edge memory 23e. Data stored in the window memory 23w are fed into the window gate 16, and data extracted from the edge extracting operator 14 are fed into the window gate 16, so that a logical product (AND) of the both data is calculated in the window gate 16, and the logical product is fed into the edge memory 23e to be stored therein.

Figure 4:
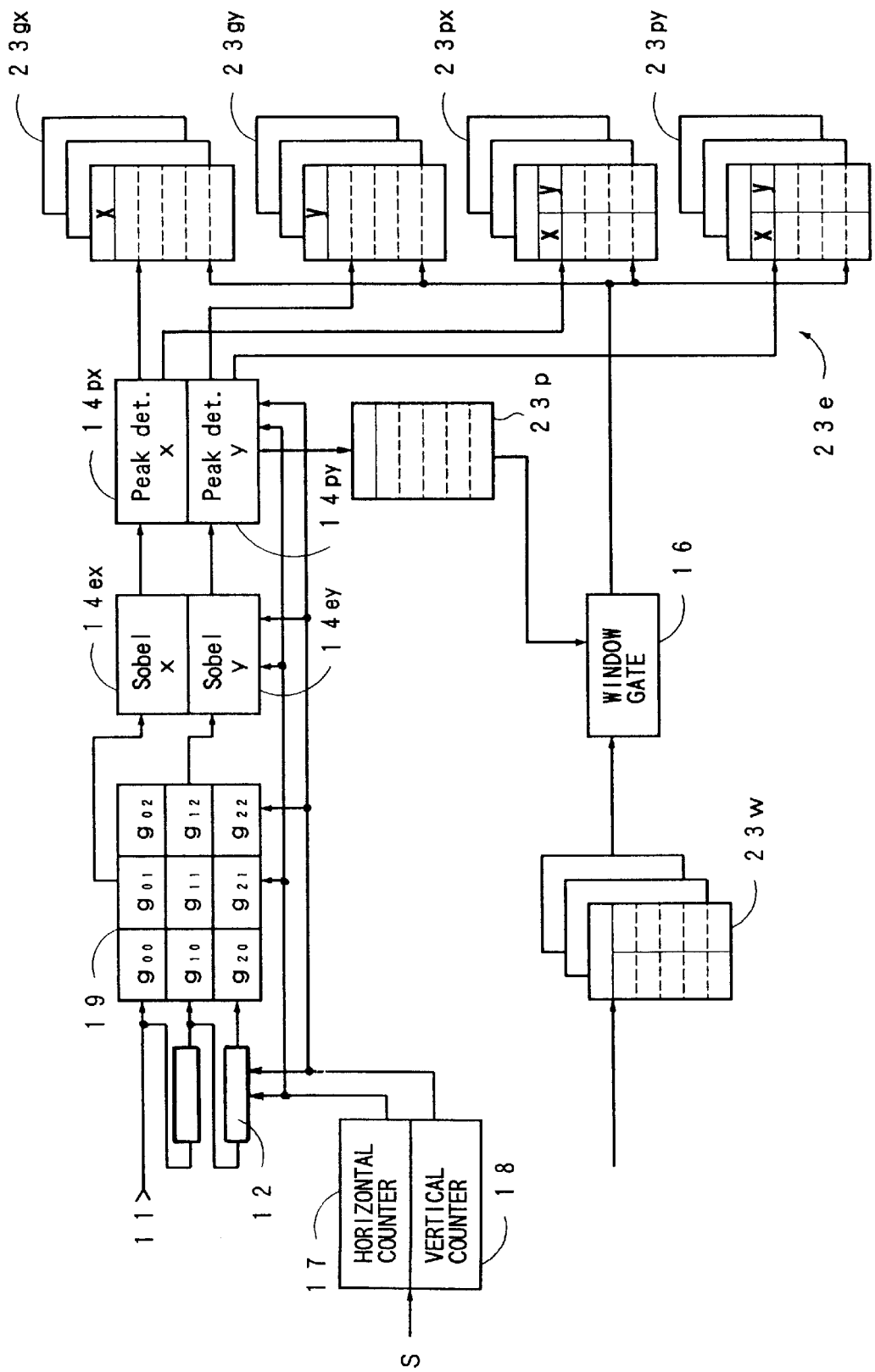
FIG.4 is a block diagram of an edge detection section in an image processing system according to an embodiment of the present invention.

Referring to FIG.4 which illustrates a functional block diagram for detecting the edges, a synchronous signal S is fed through a horizontal counter 17 and a vertical counter 18 into two line buffers 12, 3×3 matrix resister 19, Sobel edge extracting operators 14ex, 14ey, and peak detectors 14px, 14py. Accordingly, the image data with three scanning lines are fed through two line buffers 12 into the 3×3 matrix resister 19, so that the edges on the x-coordinate and the y-coordinate of the two-dimensional image display are detected, and the peak values detected by the peak detectors 14px, 14py are fed into the edge memory 23e. A peak detection memory 23p is provided for obtaining the peak value on the y-coordinate.

The logical product (AND) of the value stored in the peak detection memory 23p and the value stored in the window memory 23w when the peak was determined in the window gate 16, is obtained, so that the position and width of the window are fed into the edge memory 23e. The edge memory 23e has a density memory 23gx on the x-coordinate and a density memory 23gy on the y-coordinate, and also a coordinate memory 23px on the x-coordinate and a coordinate memory 23py on the y-coordinate, in which the peak values of the edge are stored, respectively.

Figure 5:
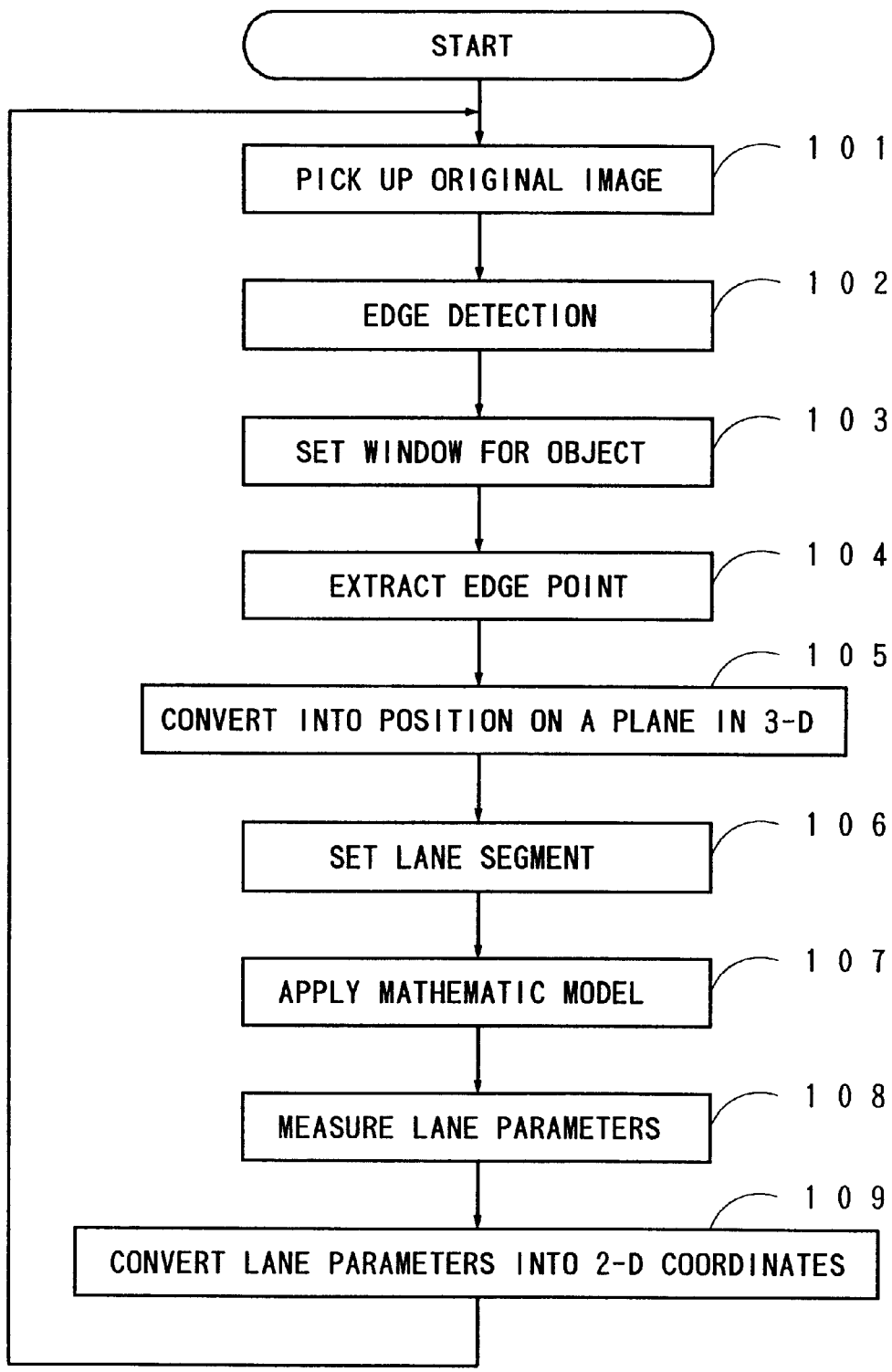
FIG.5 is a flowchart for image processing according to an embodiment of the present invention.
Figure 6:
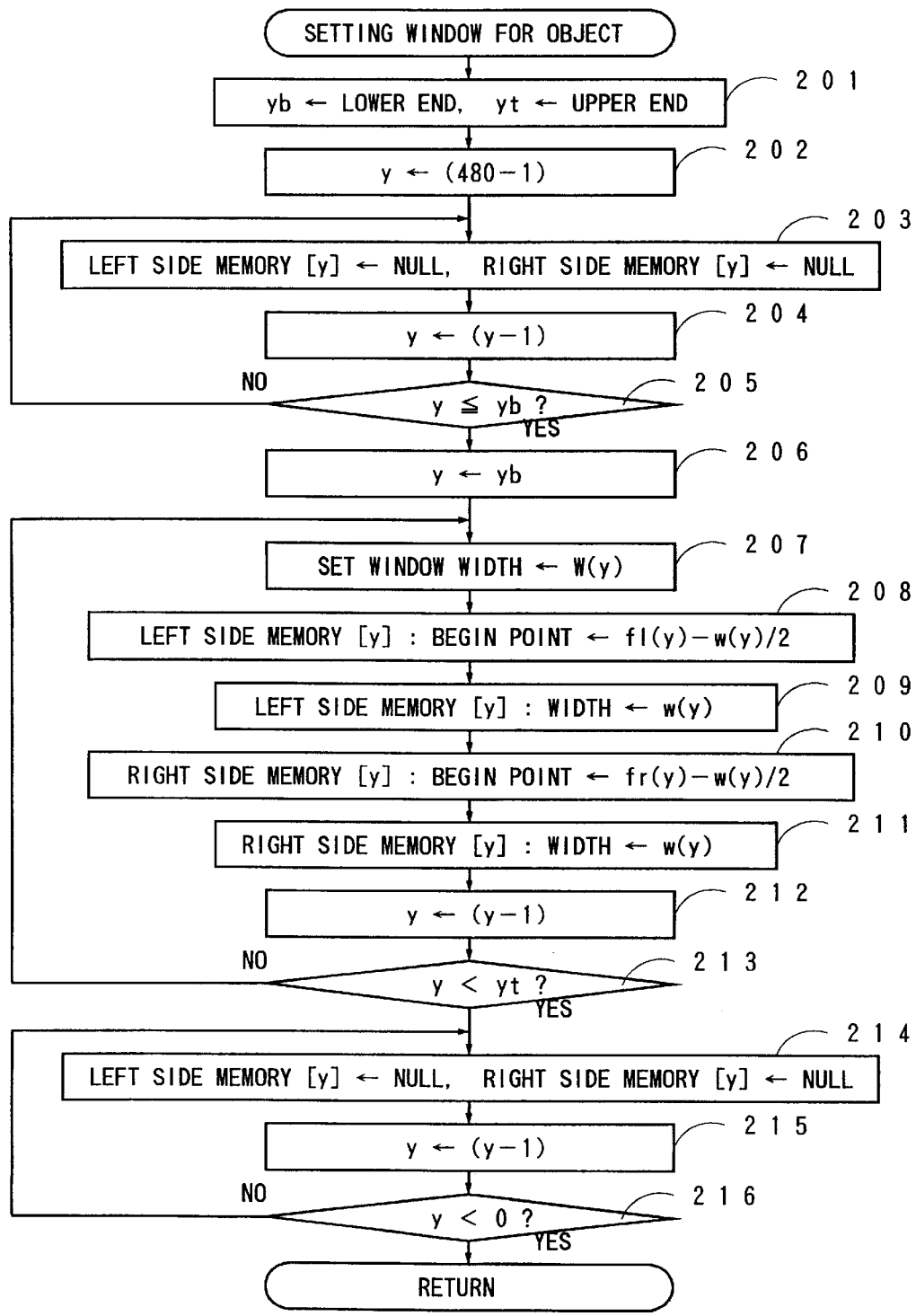
FIG.6 is a flowchart for setting a window for an object according to an embodiment of the present invention.
Figure 7:
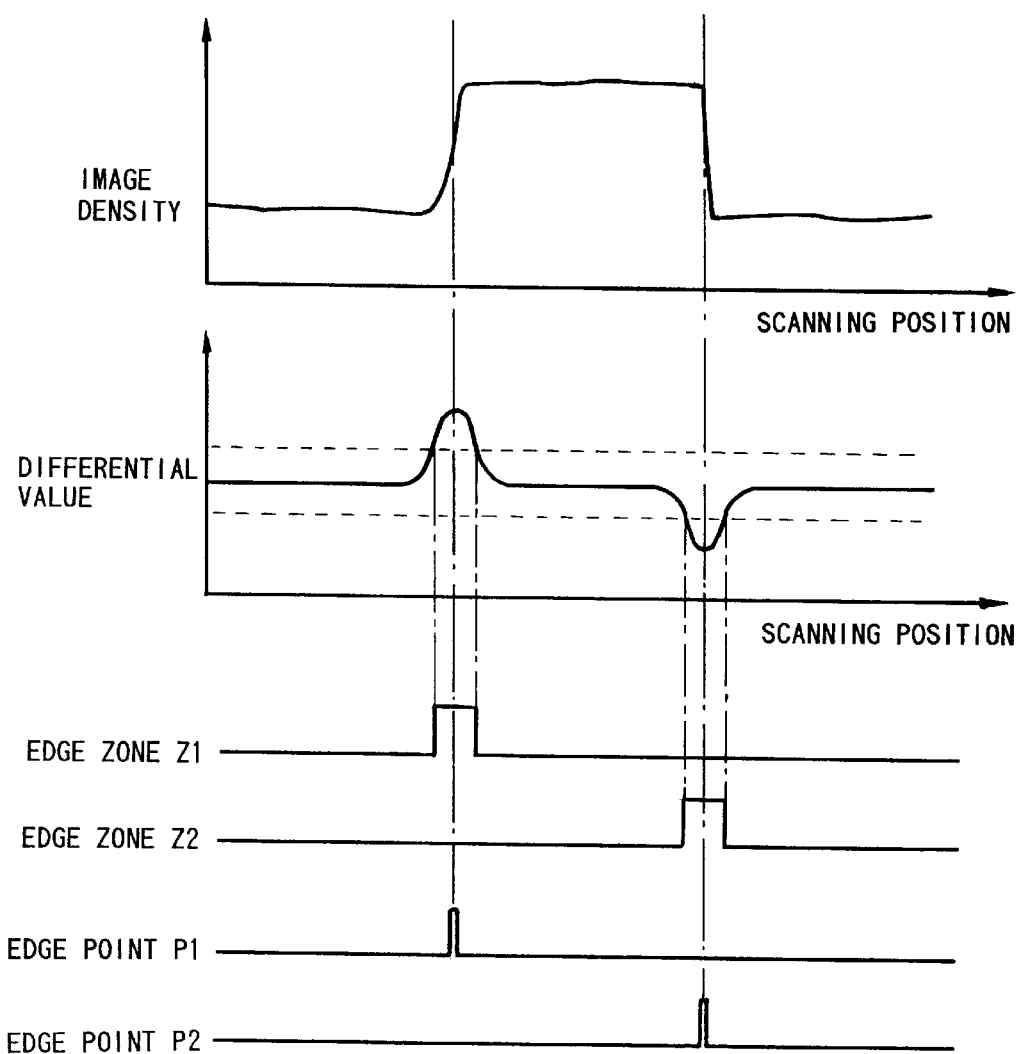
FIG.7 is a graph showing detection of edge points according to an embodiment of the present invention.

According to the above-described embodiment, the image processing is performed in accordance with flowcharts as shown in FIGS.5 and 6. Referring to FIG.5, at Step 101, all of the image signals output from the CCD camera 1 are fed through the AD converter 11 and the line buffer 12 into the detection circuit 13 to introduce the image information. Then, the edges are detected at Step 102. According to the present embodiment, edge points are obtained on the basis of the edges as shown in FIG.7, and the x-coordinate and y-coordinate of each edge point are specified. At Step 103, the window is set for the object at the present iteration step of the image processing, as will be described later with reference to FIG.6.

FIG.7 shows a method for extracting the edge points. At the outset, the signal indicative of the density of the image is differentiated to provide a differential value (peak value) which is processed by a binary processing in accordance with a predetermined threshold level to form edge point zones Z1, Z2. Then, in the middle of the edge point zones Z1, Z2, edge points P1, P2 are obtained by a process for narrowing the zones, respectively, for defining the outline of the object. While the edge points are used in the present embodiment, in addition to the edges which are generally used for defining the outline, the edges may be used as they are. Then, the program proceeds to Step 104 where the logical product (AND) of the edge points obtained on the basis of the edges at Step 102 and the window for the object set at step 103, to extract the edge points which reside in the window. Then, the program further proceeds to Step 105 and Steps following it, which perform a specific process for the object which forms a curve or a straight line, e.g., a generally white, solid or broken line having a constant width for use in a vehicle lane on a road, which is abbreviated as a white line hereinafter.

Figure 8:
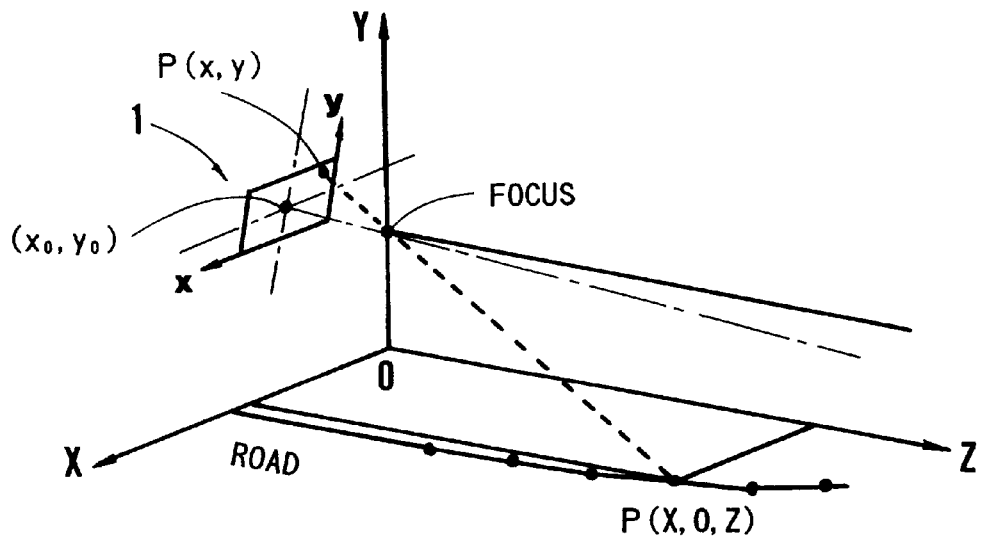
FIG.8 is a diagram of coordinate systems showing edge points which are converted into positions on a plane in a three-dimensional geometry according to an embodiment of the present invention.
Figure 9:
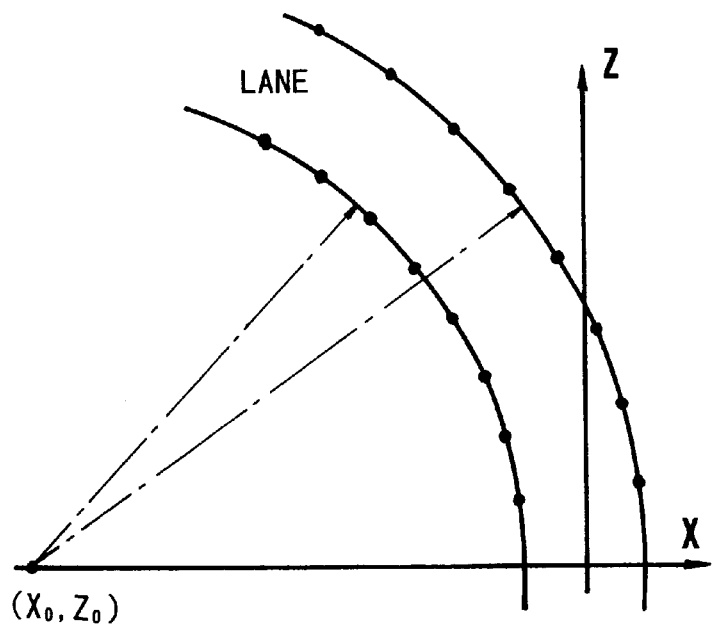
FIG.9 is a diagram of coordinate systems showing edge points which are converted into positions on a plane in a two-dimensional geometry according to an embodiment of the present invention.

At Step 105, the edge points on the image display which were extracted at Step 104 are converted into positions on the plane in the three-dimensional geometry, such that the edge points reside on a road surface, as shown in FIGS.8, 9. While the coordinate axes x, y of the two-dimensional geometry, the coordinate axes X, Y, Z are used for the three-dimensional geometry in FIGS.8, 9. By means of the edge points converted into the positions on the plane in the three-dimensional geometry, lane segments are defined at Step 106. Then, a mathematic model is applied to the arrangement of the segments at Step 107, and the program proceeds to Step 108 where parameters indicative of a shape of the lane such as a radius of curvature, width of lane and the like are measured in accordance with the mathematic models applied to the arrangements of the segments. Then, the program further proceeds to Step 109 where the parameters indicative of the shape of the lane are converted into the-two-dimensional coordinates to provide for setting the window for the object at the next iteration step.

The window for the object is set at Step 103 in accordance with a process as shown in PIG.6. At the outset, values for setting an upper end and a lower end of the axis of ordinate (y-axis) of the window for the object (hereinafter, simply referred to as the window) are set as predetermined values yb, yt (e.g., yb≧0, yt≦479) at Step 201, respectively, and a value of a position y on the y-axis is set to provide the lowest end (y=480−1=479) at Step 202. Then, at Step 203, a memory [y] for setting a left side window and a memory [y] for setting a right side window are cancelled (NULL). After the value y on the y-axis is decremented (y−1) at Step 204, the value y is compared with the predetermined value yb at Step 205, and Steps 203 and 204 are repeated until the value y becomes equal to or less than the predetermined value yb. When the value y becomes equal to or less than the predetermined value yb, the program proceeds to Step 206 where the value y is set to be the predetermined value yb. Thus, the lowest end of the image display is set, so that the process at Step 207 and Steps following it start from the lowest end (yb) of the image display.

Figure 10:
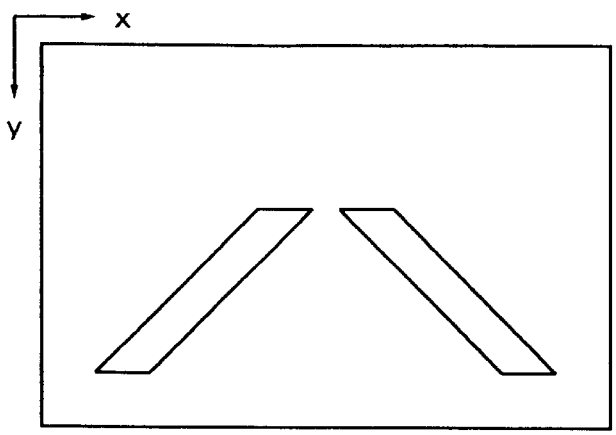
FIG.10 is a front view of an example of a window for an object for use in an embodiment of the present invention.
Figure 11:
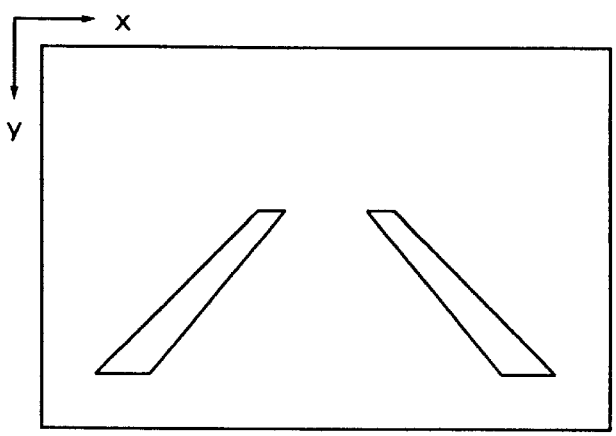
FIG.11 is a front view of another example of a window for an object for use in an embodiment of the present invention.
Figure 12:
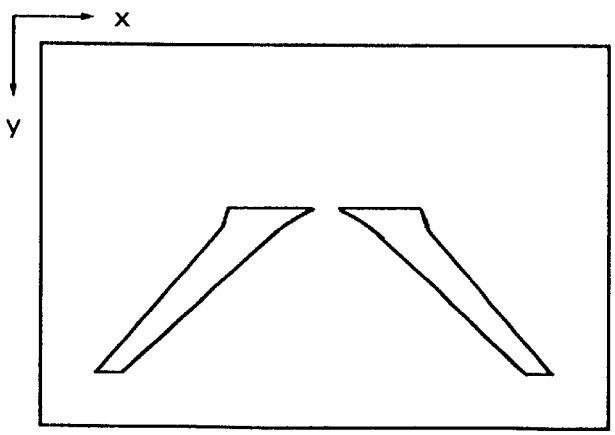
FIG.12 is a front view of a further example of a window for an object for use in an embodiment of the present invention.

At Step 207, the width of the window is set to be w(y). The width w(y) of the window may be constant, i.e., w(y)=Ky, where Ky is constant as shown in FIG.10, or may be constant on the plane in the three-dimensional geometry as shown in FIG.11. The width w(y) of a remote portion of the window may be broadened as shown in FIG.12. Then, at Step 208, the beginning point in the memory [y] for setting the left side window is set to be [fl(y)−w(y)/2], where fl(y) indicates the previous value of the center of the left white line on the plane in the two-dimensional geometry. At Step 209, the width in the memory [y] for setting the left side window is set to be w(y). Also, at Step 210, the beginning point in the memory [y] for setting the right side window is set to be [fr(y)−w(y)/2], where fr(y) indicates the previous value of the center of the right white line on the plane in the two-dimensional geometry. At Step 211, the width in the memory [y] for setting the right side window is set to be w(y).

According to the present invention, therefore, the shape of the window is defined by the reference point (beginning point) and the width. The beginning point and end point may be set to define the shape of the window, instead.

After the value y on the y-axis is decremented (y−1) at Step 212, the value y is compared with a predetermined value yt indicative of the upper end of the window at Step 213, so that Steps 207 to 212 are repeated until the value y becomes less than the predetermined value yt. When the value y becomes less than the predetermined value yt, the program proceeds to Step 214. As a result, the value y exceeds the predetermined upper limit set on the image display, the program proceeds to Step 214 where the memory [y] for setting the left side window and the memory [y] for setting the right side window are cancelled. After the value y on the y-axis is decremented (y−1) at Step 215, the value y is compared with "0" at Step 216, and Steps 214 and 215 are repeated until the value y becomes less than "0". When the value y becomes less than "0", the program returns to the routine as shown in FIG.5.

As described above, the shape of the window can be set in accordance with the combination of the reference point and the width, or the combination of the beginning point and the end point, so as to form various shapes such as curve, rectangular and so on. Therefore, appropriate images can be formed with respect to curved lanes, as well.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An image processing system comprising:

image detection means for introducing image information of an object to detect image data for indicating at least a density of said object;

scanning table memory means for providing addresses in accordance with horizontal or vertical scanning lines, providing a horizontal or vertical location information for each address, providing a variable window defined by a reference point and a width with respect to the reference point on the basis of the location information and in accordance with said object, and storing said variable window in a single table memory; and image processing means for forming a desired image on the basis of a logical product of said image data and said window, said scanning table memory means providing said window for the image formed at a next iteration step on the basis of said desired image formed by said image processing means.

2. The image processing system as set forth in claim 1, wherein said scanning table memory means includes window setting means for setting a x-coordinate and a y-coordinate to at least a reference point for each address on the basis of said image data provided for forming said desired image, and setting a predetermined width to each reference point to provide said window and store said window in said table memory.

3. The image processing system as set forth in claim 1, wherein said scanning table memory means includes window setting means for setting a z-coordinate and a y-coordinate to each of a beginning point and an end point for each address on the basis of said image data provided for forming said desired image to provide said window and store said window in said table memory.

4. The image processing system as set forth in claim 1, wherein said image detection means includes edge detection means for detecting edges of said object on the basis of the density of said image information.

5. The image processing system as set forth in claim 4, further comprising camera means for picking up image information in a visible region including said image information of said object, said edge detection means introducing said image information picked up by said camera means to detect said edges.

6. The image processing system as set forth in claim 1, further comprising image memory means for storing said image data detected by said image detection means, said image processing means forming the desired image on the basis of the logical product of said image data stored in said image memory means and said window provided by said scanning table memory means.

7. The image processing system as set forth in claim 6, wherein said image detection means includes edge detection means for detecting edges of said object on the basis of the density of said image information, and wherein said image memory means includes edge memory means for storing said edges.

8. The image processing system as set forth in claim 7, further comprising camera means for picking up image information in a visible region including said image information of said object, said edge detection means introducing said image information picked up by said camera means to detect said edges.

9. The image processing system as set forth in claim 1, wherein said scanning table memory means is adapted to provide said window for detecting a single object in a single table memory.

10. The image processing system as set forth in claim 1, wherein said image processing means is adapted to convert a logical product of said window and said image data into an image on a plans in a three-dimensional geometry to form said desired image including said object, and further converting said image on the plane in the three-dimensional geometry into an image on a plane in a two-dimensional geometry, and wherein said scanning table memory means is adapted to provide said window for the image formed at the next iteration step on the basis of the result converted by said image processing means.

* * * * *

UNITED STATES PATENT AND TRADEMARK OFFICE
CERTIFICATE OF CORRECTION

PATENT NO. : 6,205,234 B1
DATED : March 20, 2001
INVENTOR(S) : T. Kakinami et al.

It is certified that error appears in the above-identified patent and that said Letters Patent is hereby corrected as shown below:

Title page,
Item [22], Filing Date, delete "July 21, 1997" insert -- July 31, 1997 --.

Signed and Sealed this

Thirtieth Day of October, 2001

Attest:

*Nicholas P. Godici*

NICHOLAS P. GODICI
*Attesting Officer*    *Acting Director of the United States Patent and Trademark Office*